United States Patent [19]

Tekippe

[11] Patent Number: 4,799,751

[45] Date of Patent: Jan. 24, 1989

[54] DETECTION DEVICE USING FIBER OPTIC TECHNIQUES

[75] Inventor: Vincent J. Tekippe, Des Plaines, Ill.

[73] Assignee: Gould Inc., Rolling Meadows, Ill.

[21] Appl. No.: 494,843

[22] Filed: May 16, 1983

[51] Int. Cl.⁴ .......................... G02B 6/26; G02B 6/02; H01J 5/16; H01R 39/46

[52] U.S. Cl. .............................. 350/96.15; 350/96.29; 250/227; 310/220

[58] Field of Search ............... 350/96.15, 96.16, 96.29; 250/227; 310/220, 324

[56] References Cited

U.S. PATENT DOCUMENTS

| | | | |
|---|---|---|---|
| 3,327,584 | 6/1967 | Kissinger | 88/14 |
| 4,249,076 | 2/1981 | Bergstrom | 250/227 |
| 4,334,321 | 6/1982 | Edelman | 350/96.29 X |
| 4,432,599 | 2/1984 | McMahon | 350/96.15 |

OTHER PUBLICATIONS

J. Anthony Powell, "Optical Zero-Differential Pressure Switch and Its Evaluation in a Multiple-Pressure Measuring System", Aug. 1977, Report No. TM X-3571 (NASA Report).

R. O. Cook and C. W. Hamm, "Fiber Optic Lever Displacement Transducer", Applied Optics, vol. 18, No. 19, Oct. 1, 1979, pp. 3230-3241.

Primary Examiner—William L. Sikes
Assistant Examiner—Akm E. Ullah

[57] ABSTRACT

A deflection detection device for monitoring deflection of a diaphragm having a radius r has a first plurality of optical fibers having fiber ends concentrically disposed about the center of the diaphragm at a radius $r_1$ where $r_1$ is less than r. A second plurality of optical fibers having fiber ends concentrically disposed about the center of the diaphragm forms a circle having a radius $r_2$ where r is greater than $r_2$ is greater than $r_1$. A third plurality of optical fibers having fiber ends concentrically disposed about the center of the diaphragm forms a circle having a radius $r_3$ where r is greater than $r_3$ is greater than $r_2$. The ends of the first and third plurality of optical fibers are light capturing and the ends of the second plurality of optical fibers are light emitting. Deflection of the diaphragm is detected when light from the second plurality of fibers is reflected off the diaphragm into the first and third plurality of fibers in proportion to the amount of deflection of the diaphragm according to a predetermined ratio.

11 Claims, 3 Drawing Sheets

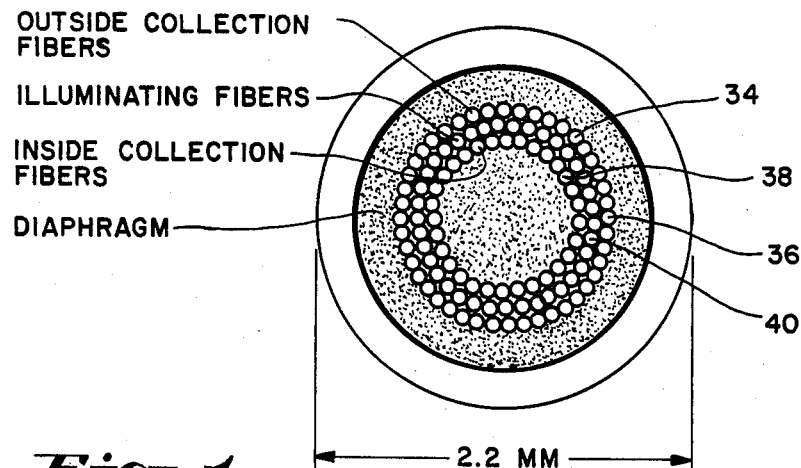
*Fig. 1*
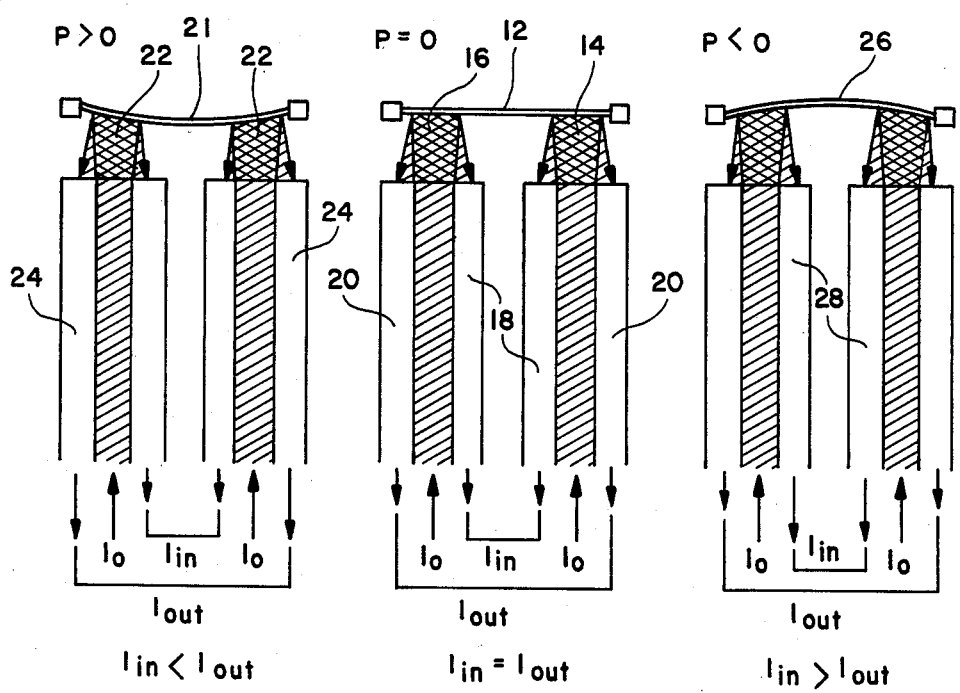
*Fig. 2*   *Fig. 3*   *Fig. 4*

DETECTION DEVICE USING FIBER OPTIC TECHNIQUES

BACKGROUND OF THE INVENTION

A. Field of the Invention

The subject invention relates generally to devices for monitoring deflection of a diaphragm and more specifically to deflection detection devices using fiber-optic apparatus.

B. Description of the Prior Art

Increasing attention has recently been devoted to the development of remote, fiber-optic, sensing methods because of the advantages that fiber-optic sensors can offer over conventional sensors. The small size of these sensors, their immunity to electromagnetic interference, and their complete electrical isolation make fiber-optic sensing an attractive alternative in hazardous or explosive environments, in high-temperature or high-electromagnetic field environments, and for in vivo medical applications. Discussions of such applications may be found in the following papers: J. Hecht, "Fiber Optics Turns to Sensing," High Tech. 2 (4), 49; and T. G. Giallorenzi, et al., "Optical Fiber Sensor Technology," IEEE J. Quantum Electron., QE-18, 626.

Diaphragms are one of the most common instruments for measuring pressure. Most of the optical methods developed to date for the measurement of diaphragm deflection have relied on the variation in optical intensity due to diaphragm displacement. In particular, fiber-optic sensors have been developed which utilize the variation in light reflected off of the center of the diaphragm, the motion of vanes or shutters attached to the diaphragm, and the variation of the transmission of an optical fiber compressed by the diaphragm. See, for example: R. O. Cook, et al., "Fiber Optic Lever Displacement Transducer," Appl. Opt. 18, 3230 (1979); "Optical Zero-Differential Pressure Switch and its Evaluation in a Multiple-Pressure Measuring System," NASA Technical Memorandum, NASA TM X-3571; T. A. Scott, "Non-contacting Optical Sensor," Conference Proceedings, General Sensor Technology/Force and Pressure Sensors, Chicago, Ill., (June 8-10, 1982) p. 79; W. B. Spillman, Jr., et al., "Schlieren Multimode Fiber-Optic Hydrophone," Appl. Phys. Lett. 37, 145 (1980); J. N. Fields, et al., "Fiber-Optic Pressure Sensor," J. Acoust. Soc. Am., 67, 816 (1980); and J. N. Fields, et al., "Fiber Microbend Acoustic Sensor," Appl. Opt. 19, 3265 (1980).

The primary disadvantage of these types of optical pressure sensors lies in their inherent environmental sensitivity. Because these devices measure absolute intensity, the output signal will be affected by intensity losses due to source intensity fluctuations and fiber microbend losses. Furthermore, pressure sensing schemes that measure the distance to the diaphragm, such as vane sensors and conventional reflectance sensors, will be strongly affected by changes in this distance due to environmental effects such as vibration and thermal expansion.

In addition to the use of diaphragms to measure pressure, diaphragms may also be used to measure temperature. When a diaphragm is used to measure temperature, it is envisioned that the diaphragm is made of a material that will respond by deflecting in response to a temperature. For instance, a bimetallic material may be used for the diaphragm. The subject invention comprehends that such a metallic diaphragm may be used in the present invention with the optical fiber system discussed hereinbelow.

SUMMARY OF THE INVENTION

To minimize the environmental sensitivity problems discussed above, a pressure transducer which relies on diaphragm curvature rather than diaphragm displacement has been designed. In this design, the light is brought to the diaphragm surface by a circle of fibers such that the light impinges on the diaphragm at a radial distance x from the diaphragm center. The light reflected from the diaphragm is then distributed among collection fibers arranged concentrically with the illumination fibers, both inside and outside of the illuminating fibers (see FIG. 1a). The inner group of fibers constitutes a first plurality of optical fibers, the illumination fibers constitute a second plurality of optical fibers, and the collection fibers outside the illumination fibers represent a third plurality of optical fibers. The diaphragm deflection is then derived from the ratio of the light received by the outside collection fibers to that from the inside collection fibers. Because of this procedure of using ratios, this sensing technique automatically compensates for variation in the source intensity, for losses in the input fibers, and for variations in the reflectivity of the diaphragm surface. Furthermore, since the pressure determination depends on the diaphragm curvature instead of the distance between the fibers and the diaphragm, this technique is immune to both temperature and vibration effects which cause a displacement of the fiber bundle relative to the diaphragm. Finally, such a system is easy to calibrate since it can be made to operate in a linear fashion.

It is an object of one embodiment of the subject invention to provide a deflection detection device having a dynamic range of ±100 psi.

It is another object of one embodiment of the subject invention to provide a device which has a linear response with less than a 0.25% error over the entire range to be monitored.

It is yet another object of one embodiment of the subject invention to provide a highly sensitive device with a minimal detectable pressure of less than $1 \times 10^{-3}$ psi.

It is yet another object of one embodiment of the subject invention to provide a device having overpressure protection to 300 psi.

Still yet another object of the subject invention is to provide a device having a reasonable ratio of diaphragm radius to thickness.

Yet another object of the subject invention is to provide a device having relatively simple electronics.

Another object of the subject invention is to provide a device having an output voltage directly proportional to changes in pressure.

Another object of the subject invention is to provide a relatively small device capable of being used for in vivo medical applications.

Still yet another object of the subject invention is to provide a relatively rugged device having few moving parts.

Still yet another object of one embodiment of the subject invention is to provide a device that is simple to fabricate which includes a single-fiber bundle consisting of three separate parts in a concentrical arrangement.

Still yet another object of the subject invention is to provide a device having zero set and calibration procedures which are easily adjusted in the electronics circuitry.

Another object of the subject invention is to provide a device which is insensitive to fluctuations in source intensity and losses in the input fiber.

Another objective of the subject invention is to provide a device which is relatively inexpensive.

And finally, it is an object of the subject invention to provide a device having a large degree of immunity to vibration and temperature variations.

Other objects, advantages, and novel features of the present invention will become apparent from the following detailed description of the invention when considered in conjunction with the accompanying drawings.

BRIEF DESCRIPTION OF THE DRAWINGS

FIG. 1 illustrates a cross-sectional view of the subject invention on a diaphragm;

FIG. 2 illustrates the amount of light captured by the first and third plurality of optical fibers when the diaphragm is convex with respect to the fibers;

FIG. 3 is an illustration of the light captured by the first and third plurality of optical fibers when the diaphragm is not deflected;

FIG. 4 is an illustration of the light captured by the first and third plurality of optical fibers when the diaphragm is concave with respect to the optical fibers;

DETAILED DESCRIPTION OF THE PREFERRED EMBODIMENT

Figure 5:
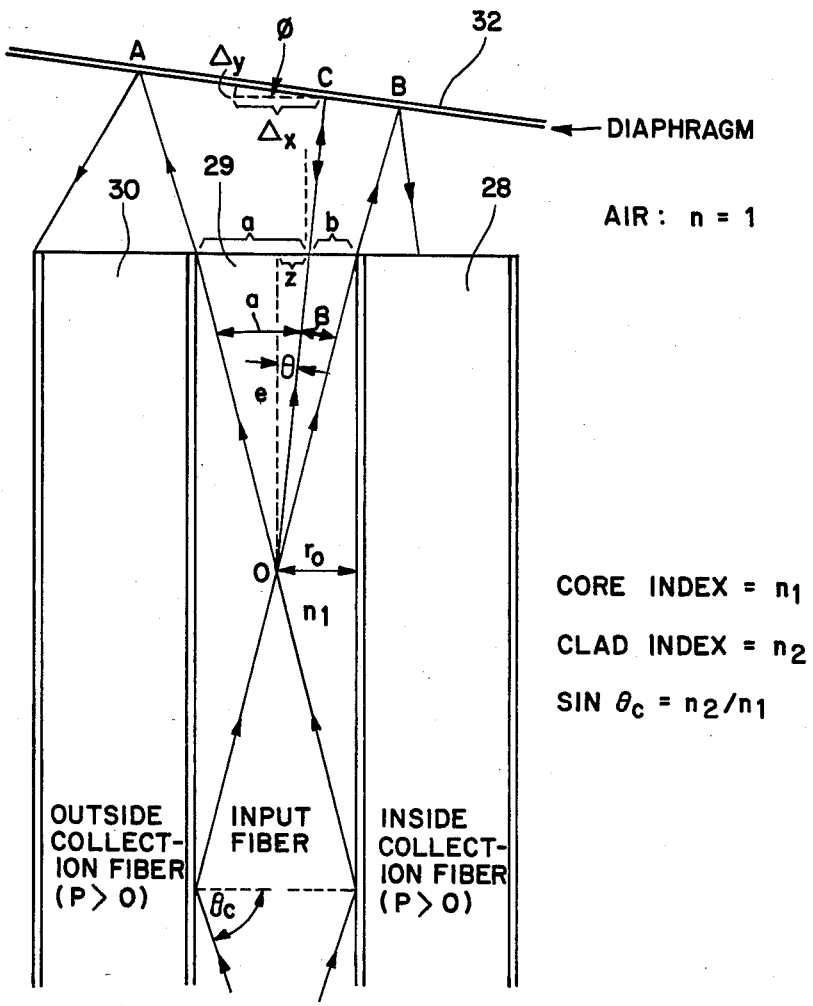
FIG. 5 is a side view of a portion of a reflective sensor showing fiber situated below a deflected diaphragm.

FIGS. 2, 3, and 4 illustrate side views of the subject sensing device in operation. When the pressure differential across the diaphragm 12 is zero (FIG. 3), the diaphragm will be flat and an equal amount of light 14, 16 will be reflected to inside 18 and outside 20 collection fibers. With positive pressure (FIG. 2), the diaphragm 21 will be convex with respect to the fibers, as illustrated, and more light 22 will be reflected to the outside collection fibers 24. Conversely, with negative pressure the diaphragm 26 will be concave (FIG. 4), and more light will be reflected to the inside fibers 28. Thus, the subject sensing technique will unequivocally sense both the magnitude and the sign (positive or negative) of the pressure.

A simplified analysis of the subject sensing technique can be made by considering one illumination fiber and two collection fibers, one inside and one outside. Because of cylindrical symmetry, the contribution from one such triplet of fibers is representative of the sum of contributions from all such triplets in an actual sensor. FIG. 5 shows such a triplet with the fiber ends 28, 29, 30 situated below a curved diaphragm. For simplicity in the analysis, any light recaptured by the input fiber 29 or cladding is neglected, and the deflection angle $\theta$ of the diaphragm is assumed constant over the illuminated region. The external rays OA and OB (FIG. 5), define the emittance aperture of the input fiber with core and cladding indices $n_1$ and $n_2$, respectively, as they are the rays which reflect at the critical angle ($\theta_c = \sin^{-1}(n_2/n_1)$) inside of the fiber. The ray OC is such that it strikes the diaphragm 32 normally and returns back on itself. Thus, the rays that exit from the fiber between OA and OC will be reflected to the outside, and those rays between OC and OB will be reflected to the inside. If the analysis is limited to the plane of the paper, then $I_{out}$ will be proportional to the angle $\alpha$ and hence the dimension a, and $I_{in}$ will be proportional to the angle $\beta$ and thus the dimension b. Hence, $$I_{out}/I_{in} = (aRI_o)/(bRI_o) = (r_o+z)/(r_o-z) \qquad \text{Eq.(1)}$$

where:
- $I_o$ the intensity of the light as it exits the illumination fiber;
- R = reflectance of the diaphragm;
- z = the distance from the center of the fiber to the point where the ray OC exits the fiber; and
- $r_o$ = radius of the fiber.

If the diaphragm slope dy/dx is small, one can then use Snell's law to obtain:

$$I_{out}/I_{in} = \frac{1 + (dy/dx)\tan\theta_c/n_1}{1 - (dy/dx)\tan\theta_c/n_1} \qquad \text{Eq.(2)}$$

Since $\theta_c = \sin^{-1}(n_2/n_1)$, it is seen from Equation 2 that the ratio of the signal intensities $I_{out}/I_{in}$ depends only on the index of refraction of the core and cladding of the illumination fiber and on the slope of the diaphragm. $I_{out}/I_{in}$ is independent of the fiber radius, the distance to the diaphragm, the reflectance of the diaphragm, and the intensity of the light as it exits the illumination fiber, and hence is quite insensitive to environmental pertubations.

The pressure dependence of the diaphragm deflection y for a uniformly loaded, edge-clamped, circular diaphragm is given as:

$$y(x) = -3(r^2-x^2)^2(1-\mu^2)P/(16Yt^3) \qquad \text{Eq.(3)}$$

according to R. J. Roark, et al., *Formulas for Stress and Strain*, Fifth Edition (McGraw-Hill, New York, 1975), where:
- x = the radial distance from the diaphragm center;
- r = the diaphragm radius;
- t = the diaphragm thickness;
- Y = Young's modulus for the diaphragm; and
- $\mu$ = Poisson's ratio for the diaphragm.

One can then obtain dy/dx by differentiating Equation 3 with respect to x, so that Equation 2 becomes:

$$I_{out}/I_{in} = (1+AP)/(1-AP). \qquad \text{Eq.(4)}$$

where: A = a constant which depends on the properties of the diaphragm and the input fiber according to the relation $$A = \frac{3x(r^2-x^2)(1-\mu^2)}{4n_1Yt^3} \tan\theta_c \qquad \text{Eq.(5)}$$

One simple method of inverting Equation 4 is to take the logarithm of both sides and expand the logarithm in powers of (AP). To first order in (AP), $$P = \ln(I_{out}/I_{in})/2A \qquad \text{Eq.(6)}$$

with a percent error of 33.3(AP)$^2$. Thus, if a diaphragm is chosen such that (AP)$^2$ is $\leq \leq 1$, then the pressure will be linearly related to the log of the ratio of $I_{out}$ to $I_{in}$, which provides for very simple signal analysis.

There has recently been significant interest in developing rugged, miniaturized pressure transducers for in vivo medical applications. To test the pressure sensing technique outlined in the previous section, a miniaturized prototype reflectance sensor was constructed and tested. The diaphragm was designed such that the optimum sensor performance would be over the applicable medical pressure range of 0–5 psi. A standard 500 fiber bundle 34 of radius 0.8 millimeters was separated into an outside collection region 36 and inside collection region 38 by an illumination strip 40 as shown in FIG. 1. Each individual multimode fiber had a core diameter of 70 microns with index $n_1 = 1.62$, surrounded by a cladding of thickness 3.5 microns with index $n_2 = 1.52$. The radius x of the illumination ring was 402 microns. The fiber bundle was epoxied into a metal sleeve of 250 micron thickness to give a miniaturized sensor with an outside diameter of only 2.2 millimeters. A diaphragm of radius 1.1 millimeters was made of 127 micron thick polycarbonate which was epoxied and edge clamped onto the end of a transducer housing connected to a variable pressure source. The fiber bundle was then inserted into the transducer housing such that the axis of the bundle was perpendicular to the diaphragm and colinear with it. The illumination fibers were then irradiated with a white light source and the received intensities $I_{out}$ and $I_{in}$ were directed into photodetectors connected to electronics designed to implement the algorithm of Equation 6.

For averaging purposes, it is advantageous to position the polished fiber bundle at the maximum distance d from the diaphragm possible, subject to the constraint that d not be so large as to allow light to be reflected outside of the perimeter of the reception fibers. This maximum distance was found to be d = 0.25 millimeters. The output signal, $\ln(I_{out}/I_{in})$, was then recorded as a function of gauge pressure P over the applicable medical pressure range. The results are shown in FIG. 6.

Figure 6:
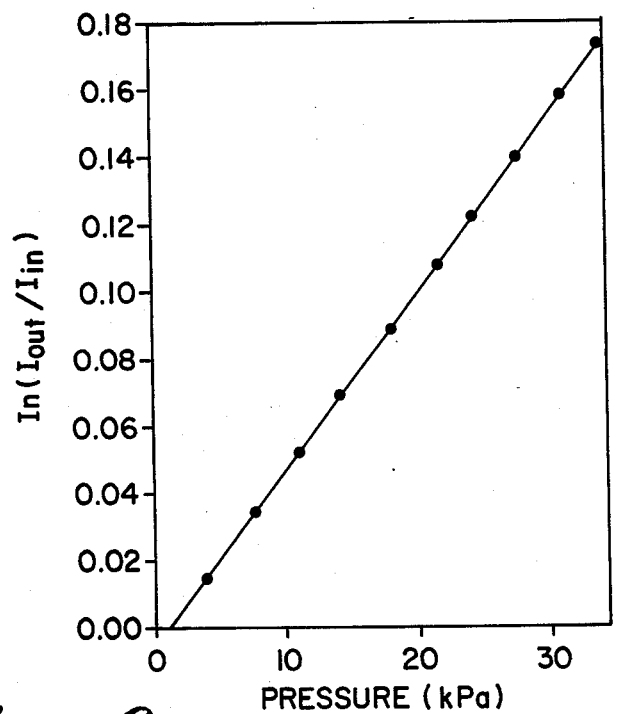
FIG. 6 is a graph illustrating output signal versus pressure.

It can be seen from FIG. 6 that $\ln(I_{out}/I_{in})$ does, in fact, vary linearly with pressure. When a linear, least-squares fit is performed on the data, the slope of this line is found to be 0.035 psi$^{-1}$, which gives an experimentally measured value for A equal to $A_{exp} = 0.0175$ psi$^{-1}$. The percent error in Equation 6 was predicted to be 33.3(AP)$^2$, which gives a maximum non-linearity of only 0.25%. This is in agreement with the excellent linearity of the data of FIG. 6, which had a correlation coefficient of 0.99995. If the relevant diaphragm parameters are substituted into Equation 5, the predicted value for A becomes 0.0157 psi$^{-1}$ which compares very favorably with the experimentally measured value. The slight discrepancy between $A_{theory}$ and $A_{exp}$ is due to the thickness of the illuminating ring of fibers. While the simple theoretical analysis given above assumes that all of the reflected light contributes to $I_{in}$ or $I_{out}$, in fact a significant portion of the light is reflected back onto the illumination ring. This results in a slight increase in the sensitivity of the device. The present invention comprehends that the relationship between the light intensity (I) captured by the inner and outer bundle of optical fibers may be defined as $(I_3 - I_1)/(I_3 + I_1)$. It has been determined that this relationship is a linear function with respect to variation in deflection of the diaphrahm.

Figure 7:
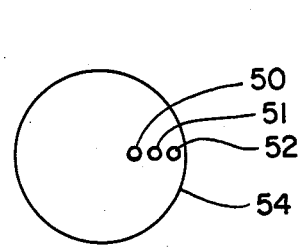
FIGS. 7-10 illustrate further embodiments of the invention.
Figure 8:
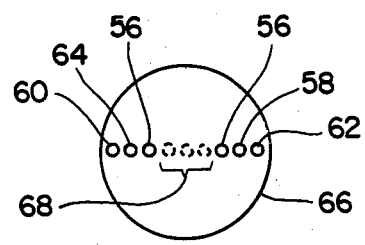
Figure 9:
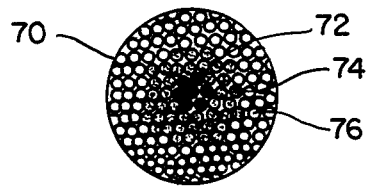
Figure 10:
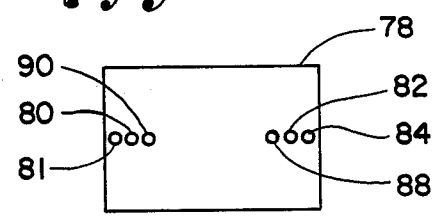

Although the subject development has been described in detail for a fiber optic bundle, it is comprehended that the subject invention includes other embodiments. For example, as illustrated in FIG. 7, it may be possible to greatly simplify the subject invention by using only three optical fibers 50, 51, and 52 in a close relationship with a diaphragm 54. In this embodiment, fiber 51 acts as an input fiber while fiber 52 acts as an outside collection fiber and fiber 50 acts as an inside collection fiber as the diaphragm is deflected in response to changes in pressure. In another embodiment of the subject invention illustrated in FIG. 8, six optical fibers are used to detect pressure. In this embodiment, fibers 56 act as inside collector fibers, fibers 58 and 64 act as input fibers and fibers 60 and 64 act as outside collection fibers with respect to diaphragm 66. This embodiment further comprehends that centrally located fibers 68 illustrated in phantom may be provided to spade each group of sensing fibers on opposite sides of diaphragm 66. In this embodiment, the centrally located fibers 68 would either not be used or not be present. An advantage of the embodiment illustrated in FIG. 8 over the embodiment illustrated in FIG. 7 is that by spacing sensing fibers on opposite sides of the diaphragm, it is possible to use symmetrical averaging techniques which may increase the reliability of the detector. In still yet another embodiment of the subject invention as illustrated in FIG. 9, an entire diaphragm 70 may be monitored with optical fibers. As illustrated in this embodiment, the optical fibers are packed into three symmetrical configurations. The center circular configuration 72 represents optical fibers acting in a collection capacity. The middle section of circular fiber 74 operate in a capacity of input fibers and the outer circular section of fibers 76 operate in an outer collection mode. In still yet another embodiment of the subject invention, it is comprehended that a flexible diaphragm 78 may be used which is not circular. This embodiment is illustrated with a rectangular diaphragm in FIG. 10. Similarly to the circular diagrams discussed above, input fibers 80 and 82 are spaced between outside collection fibers 84 and 81 and inside collection fibers 88 and 90. As the rectangular diaphragm 78 is flexed, light is captured by the inside and outside collection fibers in a similar manner to the other embodiments discussed above.

Although the present invention has been discussed with respect to a diaphragm which deflects in response to changes in pressure, it is possible to use a diaphragm which deflects in response to other conditions. For example, the present invention also comprehends that the diaphragm may deflect in response to changes in temperature. In one embodiment, the invention may be used as a temperature sensing device wherein the diaphragm is made of a bimatellic material. For instance, the diaphragm may be in the form of a bimetallic strip.

In summary, a novel optical method for sensing pressure has been developed and demonstrated utilizing diaphragm curvature instead of diaphragm displacement. The prototype pressure sensor described herein retains the small size and immunity to electromagnetic interference characteristic of fiber optic sensing techniques. And, while no diaphragm deflection measurement technique can eliminate those environmental effects which emulate pressure fluctuations, this technique does eliminate those adverse effects due to vibration and temperature which cause motion of the fiber bundle relative to the diaphragm. Also, since the dependence of the output signal on source intensity is divided out after the diaphragm, this optical sensing technique automatically compensates for variations in the source intensity, for losses in the input fibers, and for changes in the reflectivity of the diaphragm. Furthermore, if the environment of the return fibers is approximately homogeneous, much of the noise associated with fiber microbend losses will be cancelled. Finally, the device can be made to operate in a linear fashion.

Although the size and pressure range of the prototype pressure transducer described herein was engineered for in vivo medical applications, this sensing technique has more general applicability. The sensitivity and optimum pressure range of this type of sensor depends on the constant A given by Equation 5, which can be easily varied by changing the diaphragm material or thickness. For example, a much larger sensor designed to operate in the 0–60 psi regime has been fabricated, using a 12 mil.-thick silicon diaphragm with a 10.4 millimeter diameter. This sensor also had a linear pressure response, with a correlation coefficient of 0.99987 in the 0–60 psi range.

This pressure sensing technique thus has potential applicability in a variety of military and commercial applications where small size and environmental insensitivity are desired.

Although the invention has been described and illustrated in detail, it is to be clearly understood that the same is by way of illustration and example, and is not to be taken by way of limitation; the spirit and scope of this invention being limited only by the terms of the appended claims.

I claim:

1. A deflection detection device for monitoring deflection of a diaphragm, having a radium r comprising:
   a first plurality of optical fibers having fiber ends concentrically disposed about a center of said diaphragm, said first plurality of optical fibers forming a circle having a radium $r_1$, where $r_1 < r$;
   a second plurality of optical fibers having fiber ends concentrically disposed about the center of said diaphragm, said second plurality of optical fibers forming a circle having a radium $r_2$ where $r > r_2 > r_1$;
   a third plurality of optical fibers having fiber ends concentrically disposed about the center of said diaphragm, said third plurality of optical fibers forming a circle having a radius $r_3$ where $r > r_3 > r_2$;
   said ends of said first and third plurality of optical fibers are light capturing and said ends of said second plurality of fibers are light emitting, light from said second plurality of fibers being reflected off of said diaphragm into said firsts and third plurality of optical fibers in proportion to the amount of deflection of said diaphragm according to a predetermined ratio.

2. A deflection detection device as recited in claim 1, wherein said first, second, and third plurality of fibers are multimode optical fibers.

3. A deflection detection device as recited in claim 1 wherein said first, second, and third plurality of optical fibers are a combination of single-mode and multimode optical fibers.

4. A deflection detection device as recited in claim 1, further comprising:
   a housing for maintaining said first, second, and third plurality of optical fibers.

5. A deflection detection device as recited in claim 4, wherein said housing further includes means for maintaining said first, second, and third plurality of fibers perpendicular to a surface of said diaphragm.

6. A deflection detection device as recited in claim 4, wherein said housing further includes means for maintaining said first, second, and third plurality of optical fibers concentric with said diaphragm.

7. A deflection detection device as recited in claim 1, wherein a relationship between light intensity (I) captured by said third and first plurality of optical fibers may be defined as $\ln(I_3/I_1)$ and is a linear function with respect to variations in deflection of said diaphragm.

8. A deflection detection device as recited in claim 1, wherein a relationship between light intensity (I) captured by said first and third plurality of optical fibers may be defined as $(I_3 - I_1)/(I_3 + I_1)$ and is a linear function with respect to variations in deflection of said diaphragm.

9. A deflection detection device as recited in claim 1, wherein said diaphragm is deflected in response to changes in pressure on said diaphragm.

10. A detection device for monitoring environmental conditions, comprising:
    a diaphragm, said diaphragm being deflectively responsive to changes in environmental conditions;
    an input fiber having one end disposed at substantially a right angle to a deflectable surface of said diaphragm;
    a first collection fiber in close proximity with a first side of said input fiber, said first collection fiber having one end disposed at substantially a right angle to said deflectable surface of said diaphragm in close proximity to said end of said input fiber;
    a second collection fiber in proximity to a second side of said input fiber, said second collection fiber having one end disposed at substantially a right angle to said deflectable surface of said diaphragm in close proximity to said end of said input fiber;
    means for transmitting light through said input fiber onto said deflectable surface, said light transmitted from said input fiber being reflected off of said deflectable surface of said diaphragm, when said diaphragm is deflected light from said input fiber is reflected off of said diaphragm and captured by said first and second collection fibers in proportion to the amount of deflection of said diaphragm according to a predetermined ratio; and
    means for monitoring light captured by said first and second collection fibers and for producing an output signal computed from said predetermined ratio according to the proportion of light captured in said first and second collection fibers.

11. A deflection detection device as recited in claim 10, wherein said diaphragm includes a bimetallic strip being deflectively responsive to changes in temperature.

* * * * *